(12) United States Patent
Backholm

(10) Patent No.: US 10,009,940 B2
(45) Date of Patent: *Jun. 26, 2018

(54) NETWORK-INITIATED DATA TRANSFER IN A MOBILE NETWORK

(71) Applicant: Seven Networks, LLC, Marshall, TX (US)

(72) Inventor: Ari Backholm, San Carlos, CA (US)

(73) Assignee: Seven Networks, LLC, Marshall, TX (US)

( * ) Notice: Subject to any disclaimer, the term of this patent is extended or adjusted under 35 U.S.C. 154(b) by 239 days.

This patent is subject to a terminal disclaimer.

(21) Appl. No.: 14/673,775

(22) Filed: Mar. 30, 2015

(65) Prior Publication Data

US 2015/0208460 A1 Jul. 23, 2015

Related U.S. Application Data

(63) Continuation of application No. 12/860,419, filed on Aug. 20, 2010, now Pat. No. 9,001,746, which is a (Continued)

(51) Int. Cl.
| | |
|---|---|
| *H04W 80/04* | (2009.01) |
| *H04W 76/02* | (2009.01) |
| *H04M 7/12* | (2006.01) |
| *H04W 76/04* | (2009.01) |
| *H04L 29/08* | (2006.01) |

(Continued)

(52) U.S. Cl.
CPC .......... *H04W 76/028* (2013.01); *H04L 67/14* (2013.01); *H04M 7/1205* (2013.01); *H04W 76/02* (2013.01); *H04W 76/045* (2013.01); *H04L 43/0811* (2013.01); *H04L 43/10* (2013.01); *H04W 76/068* (2013.01); *H04W 80/04* (2013.01)

(58) Field of Classification Search
CPC . H04W 76/028; H04W 76/045; H04W 76/02; H04W 80/04; H04W 76/068; H04L 67/14; H04L 43/10; H04L 43/0811; H04M 7/1205

See application file for complete search history.

(56) References Cited

U.S. PATENT DOCUMENTS

| | | |
|---|---|---|
| 5,790,425 A | 8/1998 | Wagle |
| 5,978,933 A | 11/1999 | Wyld et al. |

(Continued)

OTHER PUBLICATIONS

Non-Final Office Action dated Aug. 31, 2009 for U.S. Appl. No. 11/471,704.

(Continued)

*Primary Examiner* — Hassan Kizou
*Assistant Examiner* — Hashim Bhatti
(74) *Attorney, Agent, or Firm* — NK Patent Law, PLLC

(57) ABSTRACT

A method for Internet Protocol communication from a communications server to a mobile terminal includes receiving data for communication to the mobile terminal, the data received at the communications server, identifying the unavailability of an Internet Protocol connection with the mobile terminal, and initiating the delivery of a message for establishing an Internet Protocol connection with the mobile network to the mobile terminal in response to the determination that an Internet Protocol connection is unavailable.

20 Claims, 3 Drawing Sheets

Related U.S. Application Data continuation of application No. 11/471,704, filed on Jun. 21, 2006, now Pat. No. 7,904,101.

(60) Provisional application No. 60/707,171, filed on Aug. 11, 2005.

(51) Int. Cl.
*H04W 76/06* (2009.01)
*H04L 12/26* (2006.01)

(56) References Cited

U.S. PATENT DOCUMENTS

| | | | |
|---|---|---|---|
| 6,173,312 | B1 | 1/2001 | Atarashi et al. |
| 6,526,371 | B1* | 2/2003 | Klein .................. G06F 11/3419 |
| | | | 702/119 |
| 7,139,565 | B2 | 11/2006 | Fiatal et al. |
| 7,430,609 | B2 | 9/2008 | Brown et al. |
| 8,707,406 | B2 | 4/2014 | Tosey |
| 2002/0026321 | A1* | 2/2002 | Faris ....................... A63F 13/12 |
| | | | 705/1.1 |
| 2002/0160812 | A1 | 10/2002 | Moshiri-Tafreshi et al. |
| 2004/0176128 | A1 | 9/2004 | Grabelsky et al. |
| 2004/0230619 | A1 | 11/2004 | Blanco et al. |
| 2005/0015432 | A1 | 1/2005 | Cohen |
| 2005/0043999 | A1 | 2/2005 | Ji et al. |
| 2005/0138371 | A1* | 6/2005 | Supramaniam ......... H04L 63/20 |
| | | | 713/165 |
| 2005/0255886 | A1 | 11/2005 | Aaltonen et al. |
| 2006/0063544 | A1 | 3/2006 | Zhao et al. |
| 2006/0123119 | A1* | 6/2006 | Hill ........................ H04L 67/14 |
| | | | 709/227 |
| 2006/0190563 | A1 | 8/2006 | Vann |

OTHER PUBLICATIONS

Non-Final Office Action dated Feb. 9, 2009 for U.S. Appl. No. 11/471,704.
Final Office Action dated Jul. 22, 2009 for U.S. Appl. No. 11/471,704.
Final Office Action dated Nov. 19, 2014 for U.S. Appl. No. 12/860,419.
Non-Final Office Action dated Nov. 6, 2014 for U.S. Appl. No. 12/860,419.
Non-Final Office Action dated Jun. 5, 2014 for U.S. Appl. No. 12/860,419.
Final Office Action dated Jan. 16, 2014 for U.S. Appl. No. 12/860,419.
Non-Final Office Action dated Jul. 8, 2013 for U.S. Appl. No. 12/860,419.
Non-Final Office Action dated May 13, 2011 for U.S. Appl. No. 12/860,419.
Non-Final Office Action dated Oct. 19, 2011 for U.S. Appl. No. 12/860,419.

* cited by examiner

NETWORK-INITIATED DATA TRANSFER IN A MOBILE NETWORK

BACKGROUND OF THE INVENTION

The invention relates to techniques which are colloquially referred to as pushing data. Expressed more formally, the invention relates-to methods, equipment and program products for network-initiated data transfer in a packet-switched mobile network.

In a packet-switched mobile network, a mobile terminal does is not normally assigned a dedicated circuit-switched connection. Instead, the network establishes and maintains a session for the terminal, and data packets are sent when necessary. In order to integrate mobile terminals with office applications, it is becoming increasingly popular to maintain Internet Protocol (IP) connections over packet data channels in packet-switched mobile networks. Maintaining an IP connection to/from a mobile terminal is desirable in order to keep data banks synchronized between the mobile terminal and an office computer, for example.

Maintaining an IP connection in packet-switched mobile networks involves certain problems, however. For example, it consumes the mobile terminal's battery. Further, many networks apply operator-defined policies to break connections after a certain period of inactivity. When the IP connection to/from the mobile terminal is disconnected, database synchronization is impossible before connection re-establishment. Connection re-establishment must be initiated from the mobile terminal's side, the network cannot initiate connection re-establishment.

But connection re-establishment involves further expenses in tariff and/or battery consumption. Yet further, since the network cannot initiate re-establishment of the IP connection, network-initiated data synchronization must be initiated by means of an out-band trigger, ie, signaling independent from the Internet Protocol. A short message service (SMS) and its derivatives are examples of theoretically suitable out-band triggering mechanisms. But a single GSM-compliant short message can only transfer approximately 160 characters, which means that it is impracticable to transfer actual data in the trigger message. This has the consequence that the subscriber must bear the expenses and delays in re-establishing the IP connection.

BRIEF DESCRIPTION OF THE INVENTION

An object of the present invention is to provide a method and an apparatus for implementing the method so as to alleviate the above disadvantages. The object of the invention is achieved by the methods and equipment which are characterized by what is stated in the independent claims. The dependent claims relate to specific embodiments of the invention.

The invention is based on the idea that a mobile terminal uses an in-band trigger for establishing an IP connection. The network element, when it needs to communicate with the mobile terminal, uses an existing IP connection if one is available; and if not, uses an out-band trigger for initiating the IP connection establishment. The mobile terminal responds to the out-band trigger by using an in-band trigger for establishing the IP connection. The IP connection is maintained for a predetermined time after the latest transaction (in either direction).

If no out-band trigger for initiating IP connection establishment is available, the mobile terminal enters a periodic polling mode, wherein it periodically sends inquires to or via the network element for data items to be synchronized.

An aspect of the invention is a method according to claim 1. Another aspect of the invention is a method according to claim 2. Other aspects of the invention relate to computer systems or program products for implementing the above methods.

BRIEF DESCRIPTION OF THE DRAWINGS

In the following the invention will be described in greater detail by means of specific embodiments with reference to the attached drawings, in which.

DETAILED DESCRIPTION OF SPECIFIC EMBODIMENTS

The invention is applicable to virtually any mobile network architecture. The mobile network may be based on GPRS, 1.times.RTT or EVDO technologies, for example. The invention can also be implemented as part of a push-type mobile e-mail system, particularly in a consumer e-mail system, in which optimization of network resources is important because of the large number of users.

Figure 1:
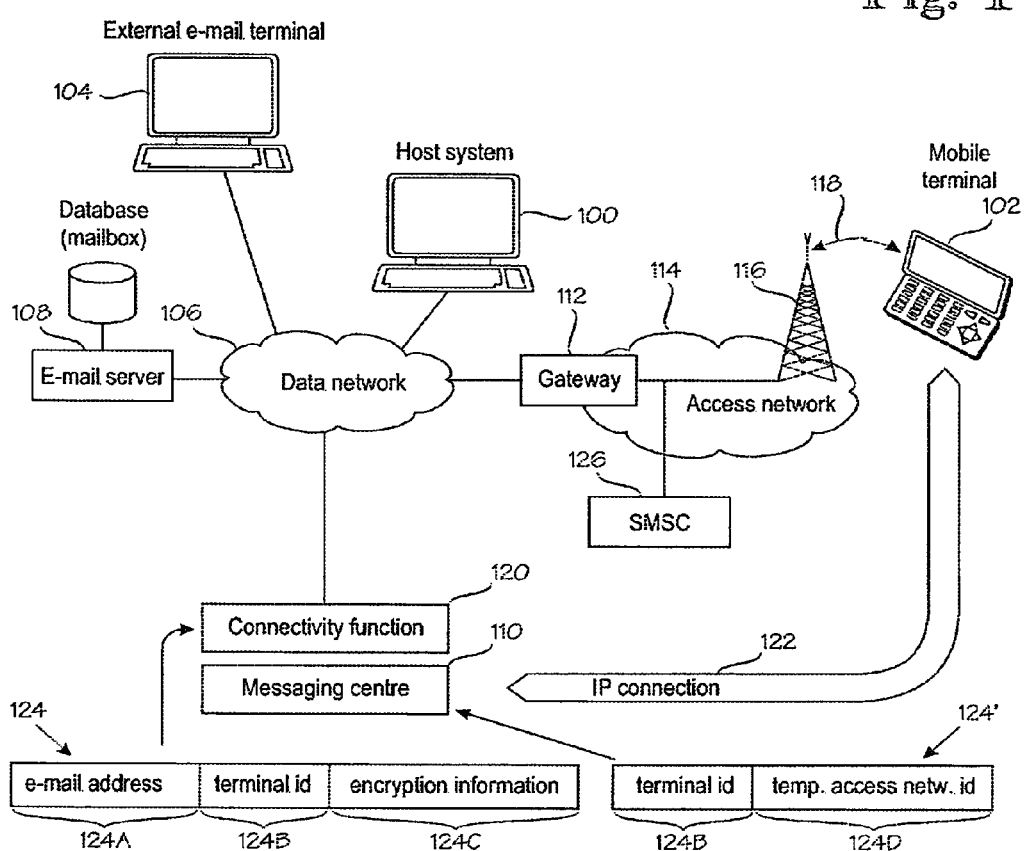
FIG. 1 shows an exemplary network arrangement in which the invention can be used.

FIG. 1 shows an exemplary system architecture which is supported by the owner of the present application. This system supports synchronization of e-mail messages and/or calendar items and/or other information between a host system and a mobile terminal.

Reference numeral 100 denotes a host system that is able to send an receive e-mail messages. Reference numeral 102 denotes a mobile terminal, also able to send an receive e-mail messages. The e-mail messages may originate or terminate at external e-mail terminals, one of which is denoted by reference numeral 104. The invention aims at improving cooperation between the host system 100 and mobile terminal 102 such that they can use a single e-mail account as transparently as possible. This means, for example, that the users of the external e-mail terminals 104, when sending or receiving e-mail, do not need to know if the user of the host system 100 actually uses the host system 100 or the mobile terminal 102 to communicate via e-mail. The transparency also means that e-mail manipulation at the mobile terminal 102 has, as far as possible, the same effect as the corresponding e-mail manipulation at the host system 100. For example, e-mail messages read at the mobile terminal 102 should preferably be marked as read at the host system.

Reference numeral 106 denotes a data network, such as an IP (Internet Protocol) network, which may be the common Internet or its closed subnetworks, commonly called intranets or extranets. Reference numeral 108 denotes an e-mail server and its associated database. There may be separate e-mail servers and/or server addresses for incoming and outgoing e-mail. The database stores an e-mail account, addressable by means of an e-mail address, that appears as a mailbox to the owner of the e-mail account. In order to communicate with mobile terminals 102, the data network 106 is connected, via a gateway 112 to an access network 114. The access network comprises a set of base stations 116 to provide wireless coverage over a wireless interface 118 to the mobile terminals 102.

Reference numeral 110 denotes a messaging centre that is largely responsible for providing the above-mentioned transparency between the host system 100 and the mobile terminal 102. The system architecture also comprises a connectivity function 120, whose task is to push e-mail messages to the mobile terminal. In the embodiment shown in FIG. 1, the connectivity function 120 is considered a physically integral but logically distinct element of the messaging centre 110.

The mobile terminal 102 may be a pocket or laptop computer with a radio interface, a smart cellular telephone, or the like. Depending on implementation, the host system 100, if present, may have different roles. In some implementations the host system 100 is optional and may be a conventional office computer that merely acts as the mobile terminal user's principal computer and e-mail terminal. In other implementations the host system may act as a platform for a single user's connectivity function, in addition to being an office computer. In yet other implementations the host system 100 may comprise the connectivity function for several users. Thus it is a server instead of a normal office computer.

We assume here that the access network 114 is able to establish and maintain a IP connection 122 between the messaging centre 110 and the mobile terminal 102.

FIG. 1 shows an embodiment in which the messaging centre 110 is largely responsible for e-mail transport to/from the mobile terminal 102 via the access network 114, while a separate connectivity function 120 is responsible for data security issues. The connectivity function 120 may be physically attached to or co-located with the messaging centre 110, but they are logically separate elements. Indeed, a definite advantage of the separate connectivity function 120 is that it can be detached from the messaging centre, for instance, within the company that owns the host system 100 or the e-mail server 108. For a small number of users, the connectivity function 120 can be installed in each host system 100, or the host system 100 can be interpreted as a separate server configured to support multiple users. It is even possible to implement some or all the above-mentioned options. This means, for example, that there is one or more messaging centres 110 that offer services to several network operators, or they may be a dedicated messaging centre for each network operator (somewhat analogous to short messaging centres). Each messaging centre 110 may have an integral connectivity function 120 to support users who don't wish to install a separate connectivity function in a host system 100. For users who do install a separate connectivity function 120 in their host systems 100, such connectivity functions bypass the connectivity function in the messaging centre 110 and address the messaging centre 110 directly.

A real e-mail system supports a large number of mobile terminals 102 and IP connections 122. In order to keep track of which e-mail account and which IP connection belongs to which mobile terminal, the messaging centre 110 and the connectivity function collectively maintain an association 124, 124' for each supported mobile terminal. Basically, each association 124, 124' joins three fields, namely an e-mail address 124A assigned to the mobile terminal or its user, encryption information 124C and a temporary wireless identity 124D of the mobile terminal in the access network. The embodiment shown in FIG. 1 also employs a terminal identifier 124B which may be the same as the e-mail address 124A of the mobile terminal 102, in which case the association 124 actually associates three information items. Alternatively, the terminal identifier 124B may be an identifier arbitrarily assigned to the mobile terminal. In a preferred implementation the terminal identifier 124B is the mobile terminal's equipment identifier or its derivative. The encryption information 124C is preferably related to the mobile terminal's equipment identity and is preferably generated by the mobile terminal itself, so as to ensure that no other terminal besides the one used for creating the encryption information 124C will be able to decrypt incoming encrypted e-mail messages. The temporary wireless identity 124D may be the identifier of the IP connection 122 to the mobile station.

In the above-described system, the messaging centre 110 and connectivity function 120 were arranged to support a fairly large number of users of e-mail and/or calendar data. In order to satisfy the needs of the present invention, virtually any communication server able to maintain an IP connection to the mobile terminal can be used.

In order to provide out-band triggers, the network arrangement is operationally coupled to a network element able to communicate to the mobile terminal even in the absence of an IP connection. In the network arrangement shown in Figure, such a network element is embodied as a short message service centre (SMSC) 126. Because the IP connection cannot be initiated from the network side, the messaging centre 110 (or any other communication server) must request the mobile terminal 102 to establish the IP connection, for example when data needs to be synchronized between the mobile terminal and some other node, such as the host system 100. Such a request to establish the IP connection can be sent in the form of a connectionless message, such as a short message or one of its derivatives, for example, a multimedia message.

Figure 2:
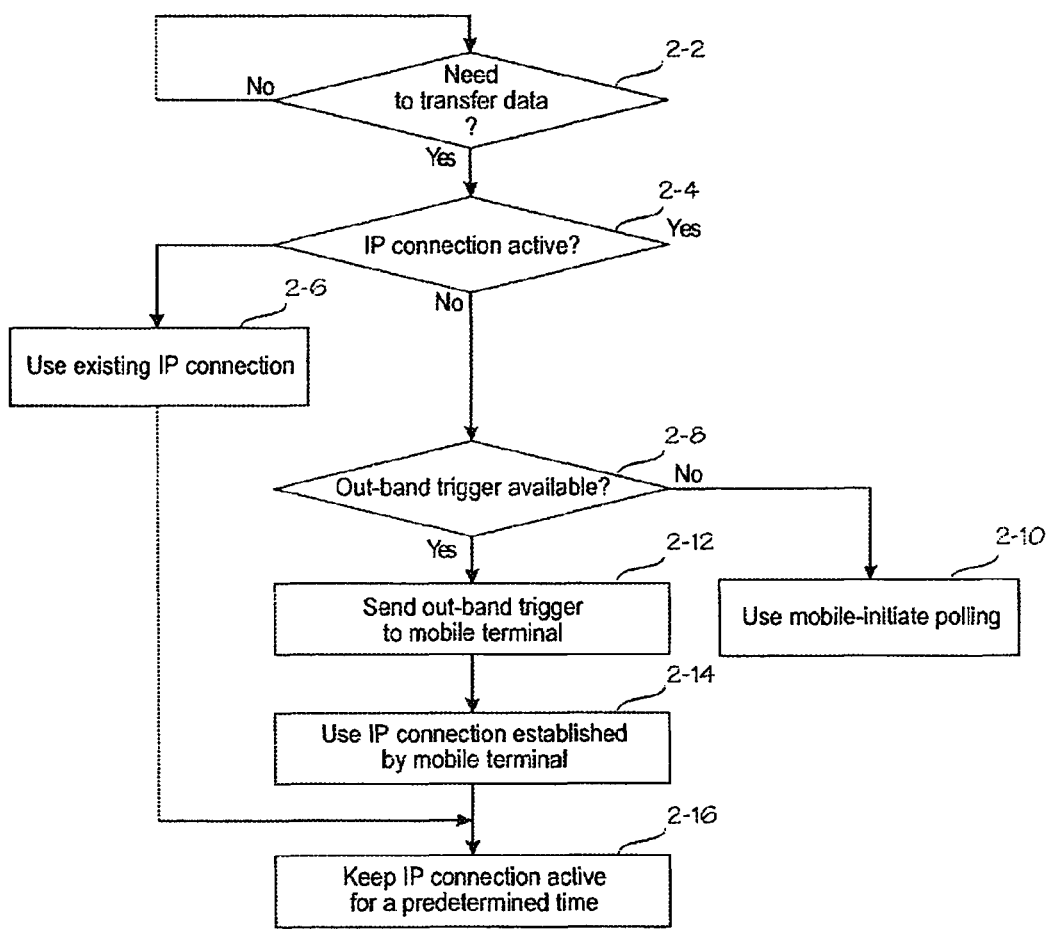
FIG. 2 shows a flowchart illustrating the principle of the invention as seen from the point of view of the network element.

FIG. 2 shows a flowchart illustrating the principle of the invention as seen from the point of view of a network element, such as the messaging centre 110 shown in FIG. 1, or some other element or server communicating with the mobile terminal. Step 2-2 is a loop in which the network element waits for a need to transfer data to the mobile terminal. In step 2-4 the network element determines if an IP connection to the mobile terminal is available. If yes, the IP connection will be used in step 2-6. After step 2-6 the process continues to step 2-16 in which the IP connection will be kept active for a predetermined time after, in order to avoid the expenses incurred in re-establishing a discontinued IP connection.

If no IP connection to the mobile terminal was not available in step 2-4, the process continues to step 2-8, in which the network element determines if an out-band triggering means, such as a short message service, is available. If not, the process continues to step 2-10, in which the network element resorts to mobile-initiated polling. In other words, the network element has no means to initiate IP connection establishment to the mobile terminal and must wait for inquiries from the mobile terminal. On the other hand, if an out-band triggering means, such as a short message service, is available, it will be used in step 2-12. In response to the trigger, the mobile terminal establishes an IP connection which the network element will use in 2-14, after which the process continues to step 2-16.

Figure 3:
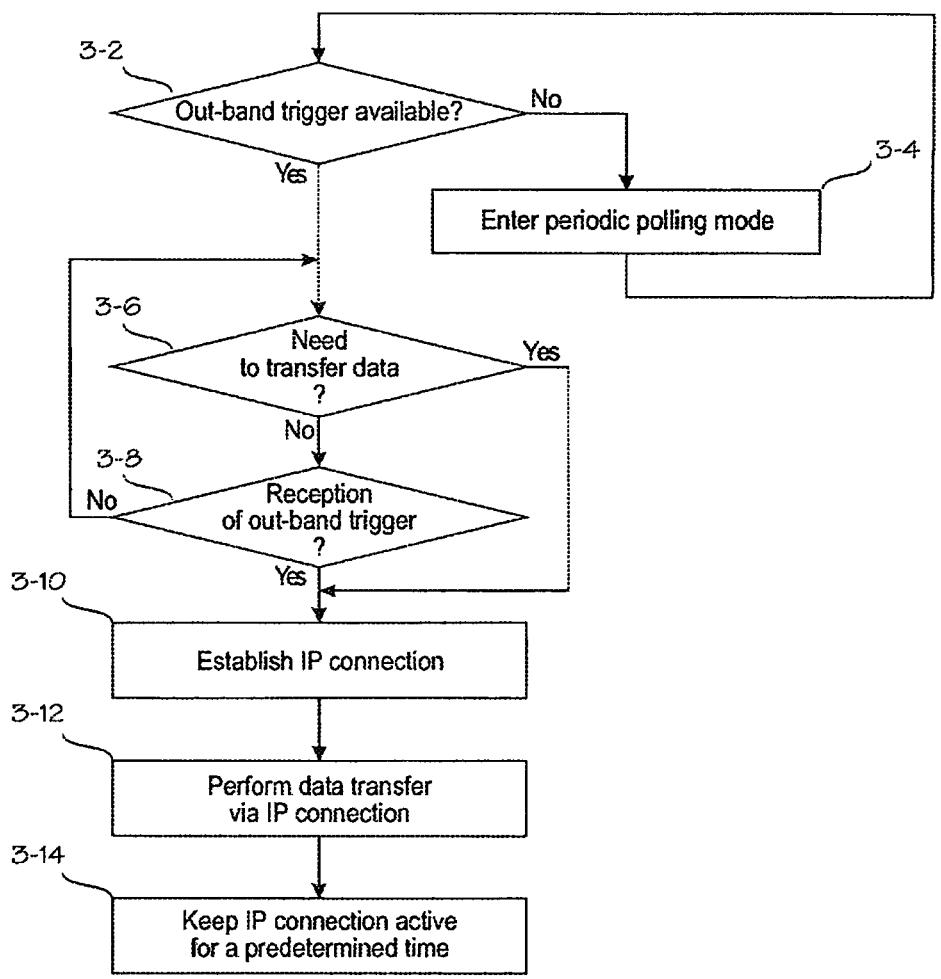
FIG. 3 shows a flowchart illustrating the principle of the invention as seen from the point of view of the mobile terminal.

FIG. 3 shows a flowchart illustrating the principle of the invention as seen from the point of view of the mobile terminal. In step 3-2 the mobile terminal determines if an out-band triggering means is available. If not, the mobile terminal knows that the network element cannot request IP connection establishment, and in step 3-4 the mobile terminal enters a periodic polling mode, in which it periodically polls the network element for new information.

The mobile terminal makes the test in step 3-2 not for its own benefit but for the network element's, because the mobile terminal can always initiate IP connection establishment. But if no out-band triggering means is available, the mobile terminal knows that it cannot expect a request from the network element to establish an IP connection, which is why it should periodically poll the network element for new data.

When the system is in the periodic polling mode, at certain periodic intervals, the mobile terminal establishes an IP connection for inquiring the network element for new data, even if the mobile terminal itself has no data to send. If the network element has data to send, the IP connection is preferably kept active for a predetermined time after the latest data transfer. This procedure will be further described in connection with step 3-14.

In step 3-6, if the mobile terminal detects a need to transfer data, it proceeds to step 3-10 to establish an IP connection with the network element. Likewise, the IP connection establishment is initiated if in step 3-8 an out-band trigger is received from the network element. After the IP connection establishment in step 3-10, the mobile terminal transfers data in step 3-12, and in step 3-14 it keeps the IP connection active for a predetermined time after the latest transaction (in either direction).

In steps and 2-16 and 3-14, the IP connection is kept active for a predetermined time after the latest transaction (in either direction), in order to avoid the expenses in re-establishing a disconnected IP connection. This step can be implemented, for example, by means of two timers (physical or logical). Let us assume, for example, that the network disconnects IP connections after an inactivity period of 5 minutes. Let us further assume that, for the sake of economy and convenience, the IP connection will be maintained for 15 minutes after the latest transaction. After each transaction, both timers will be started. When the 5-minute timer expires, a keep-alive message is sent to the other party. A keep-alive message is a message sent for the purpose of preventing the network from disconnecting the IP connection. When the keep-alive message is sent, the 5-minute timer is again restarted, until the 15-minute timer expires, after which the keep-alive messages will no longer be sent.

It is readily apparent to a person skilled in the art that, as the technology advances, the inventive concept can be implemented in various ways. The invention and its embodiments are not limited to the examples described above but may vary within the scope of the claims.

What is claimed is:

1. A method for Internet Protocol communication from a communications server to a wireless terminal, the method comprising:
   receiving data for communication to the wireless terminal, the data is received at the communications server;
   identifying an unavailability of Internet Protocol connectivity with the wireless terminal;
   determining an availability of an out-band messaging mechanism with the wireless terminal;
   initiating a delivery of a message for establishing an Internet Protocol connection with an access network to the wireless terminal in response to a determination that the Internet Protocol connection is unavailable;
   establishing the Internet Protocol connection with the wireless terminal via the access network; and transferring the data to the wireless terminal, wherein the wireless terminal is configured to enter a periodic polling mode in an absence of a previously established Internet Protocol connection and an unavailability of the out-band messaging mechanism with the communications server.

2. The method of claim 1, including:
   sending a keep-alive message over the Internet Protocol connection following a first event;
   commencing a timer following the sending of the keep-alive message; and
   terminating sending of keep-alive messages following a second event.

3. The method of claim 2, wherein the timer is physical.

4. The method of claim 2, wherein the timer is logical.

5. The method of claim 1, further including: commencing a timer after transferring the data to the wireless terminal; and disconnecting from the Internet Protocol connection following a first event.

6. The method of claim 1, wherein the message is sent from a short messaging service center in response to instructions from the communications server.

7. The method of claim 6, wherein the message is a short message service message.

8. The method of claim 1, wherein the period polling mode includes the wireless terminal periodically establishing an Internet Protocol connection with the communications server.

9. The method of claim 8, wherein the periodic polling mode further includes the wireless terminal periodically sending inquires via the Internet Protocol connection to the communications server for data items to be synchronized.

10. The method of claim 1, wherein wireless terminal is a mobile wireless terminal.

11. A server having hardware and computer code thereon, that is configured to:
    receive data for communication to a wireless terminal;
    identify an unavailability of Internet Protocol connectivity with the wireless terminal;
    determine an availability of an out-band messaging mechanism with the wireless terminal;
    initiate a delivery of a message for establishing an Internet Protocol connection with an access network to the wireless terminal in response to a determination that the Internet Protocol connection is unavailable;
    establish the Internet Protocol connection with the wireless terminal via the access network; and transfer the data to the wireless terminal, wherein the wireless terminal is configured to enter a periodic polling mode in an absence of a previously established Internet Protocol connection and an unavailability of the out-band messaging mechanism with the server.

12. The server of claim 11, wherein the server is further configured for:
    sending a keep-alive message over the Internet Protocol connection following a first event;
    commencing a timer following the sending of the keep-alive message; and
    terminating sending of keep-alive messages following a second event.

13. The server of claim 12, wherein the timer is physical.

14. The server of claim 11, wherein the server is further configured for: commencing a timer after transferring the data to the wireless terminal; and disconnecting from the Internet Protocol connection following a first event.

15. The server of claim 12, wherein the timer is logical.

16. The server of claim 11, wherein the message is sent from a short messaging service center in response to instructions from the server.

17. The server of claim 16, wherein the message is a short message service message.

18. The server of claim 11, wherein the period polling mode includes the wireless terminal periodically establishing an Internet Protocol connection with server.

19. The server of claim 18, wherein the periodic polling mode further includes the wireless terminal periodically sending inquires via the Internet Protocol connection to the server for data items to be synchronized.

20. The server of claim 11, wherein wireless terminal is a mobile wireless terminal.

\* \* \* \* \*